United States Patent
Liinamaa et al.

(10) Patent No.: US 6,324,281 B1
(45) Date of Patent: Nov. 27, 2001

(54) PROCEDURE FOR THE PROCESSING OF AN UNEXPECTED DISCONNECT REQUEST

(75) Inventors: Olli Liinamaa; Vesa Heikkila; Timo Juntunen, all of Oulu (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/368,238

(22) Filed: Aug. 4, 1999

Related U.S. Application Data

(63) Continuation of application No. PCT/FI98/00073, filed on Jan. 26, 1998.

(30) Foreign Application Priority Data

Feb. 4, 1997 (FI) ........ 970477

(51) Int. Cl.[7] .................... H04M 3/00
(52) U.S. Cl. .......... 379/242; 379/207.04; 379/207.05
(58) Field of Search ............ 379/93.26, 93.28, 379/142, 201, 207, 215, 229, 230, 242, 219, 221.03, 221.04, 207.04, 207.05

(56) References Cited

U.S. PATENT DOCUMENTS 5,566,236 * 10/1996 MeLampy et al. .......... 379/201
5,781,623 * 7/1998 Khakzar ................ 379/230

FOREIGN PATENT DOCUMENTS 0 731 618   9/1996   (EP) .
WO 97/16936   5/1997   (WO) .

OTHER PUBLICATIONS

A. Gillespie "Interfacing Access Networks to Exchanges—The ETSI V5 Approach" *IEEE Global Telecommunication Conference*, vol. 3, pp. 1754–1758.
K. Khakzar "V5 Interfaces between Digital Local Exchanges and Access Networks" *Frequenz*, pp. 44–50.
International Search Report for Application No. PCT/FI98/00073.

* cited by examiner

*Primary Examiner*—Ahmad Matar
*Assistant Examiner*—Bing Bui
(74) *Attorney, Agent, or Firm*—Altera Law Group, LLC

(57) ABSTRACT

The invention relates to a procedure for the processing of an unexpected disconnect request in an access node (AN) which is connected to a local exchange (LE) over a V5 interface. In the access node (AN), call setdown is effected by means of a disconnect message, which is sent from the local exchange (LE) and on the basis of which the call resources in the local exchange (LE) are released. According to the invention, the resources reserved in the access node (AN) for the call are preserved. Moreover, the local exchange (LE) is informed that the subscriber is busy, thus preventing the occurrence of an undefined condition between the local exchange (LE) and the access node (AN).

5 Claims, 1 Drawing Sheet

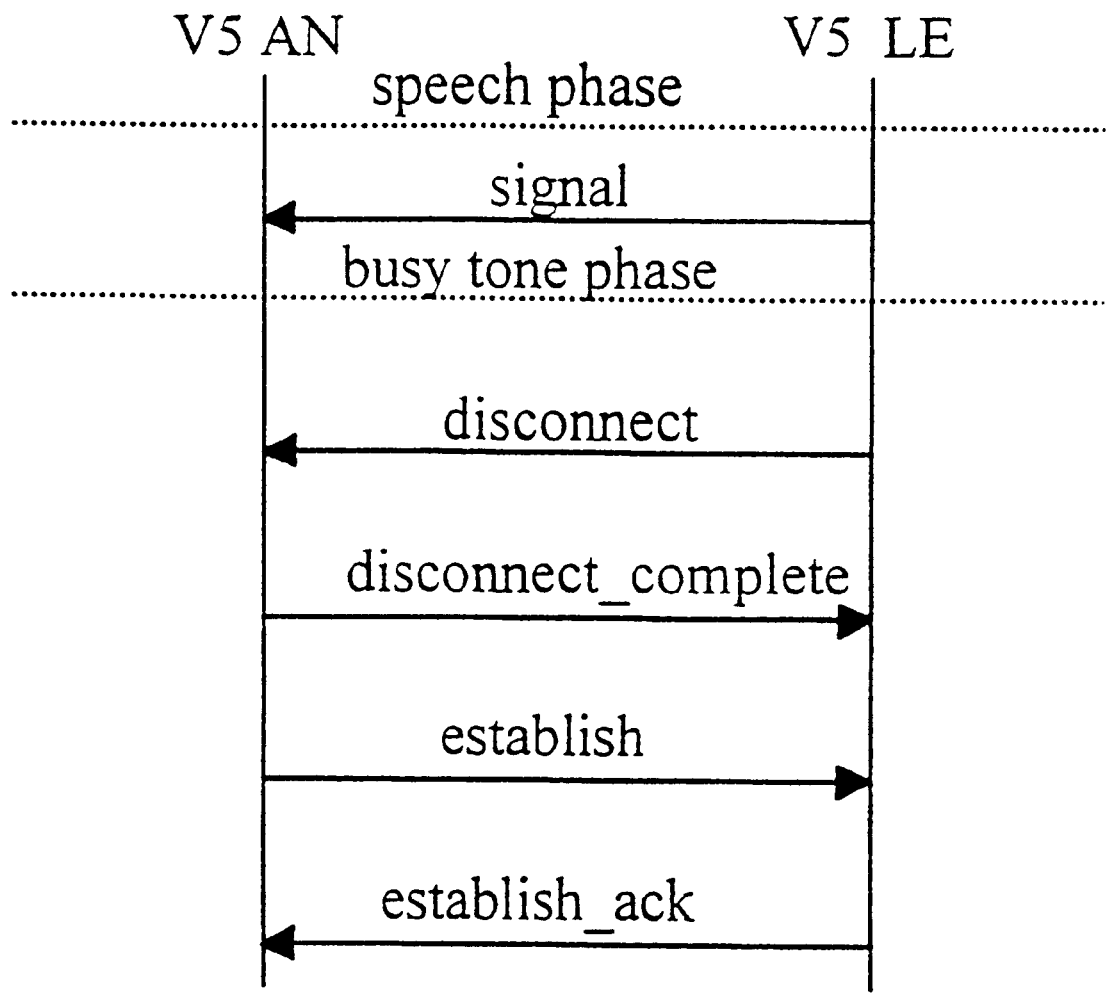

PROCEDURE FOR THE PROCESSING OF AN UNEXPECTED DISCONNECT REQUEST

This application is a continuation of international application number PCT/FI98/00073, filed Jan. 26, 1998, pending.

BACKGROUND OF THE INVENTION

1. Field of the Invention

The present invention relates to a procedure for the processing of an unexpected disconnect re quest, as defined in the preamble of claim 1.

2. Description of Related Art

For the connection of subscribers to a local exchange in a data communication network, a generally known method is one whereby subscribers are connected to a local network whose access node is connected to the local exchange.

Open interfaces (V5.1 and V5.2) between an access node and a local exchange are defined in the ETSI (European Telecommunications and Standards Institute) standards of the ETS 300 324 and ETS 300 347 series. V5 interfaces enable subscribers belonging to a physically separate local network, either wired or wireless, to be connected using the standard interface of the telephone exchange. A dynamic concentrator interface V5.2 consistent with the ETS 300 347-1 and 347-2 standards, consists of one or more (1–16) PCM (Pulse Code Modulation) lines. One PCM line contains 32 channels, each with a transfer rate of 64 kbit/s, i.e. 2048 kbit/s in all. The V5.2 interface supports analogue telephones as used in the public telephone network, digital subscriptions, such as ISDN (Integrated Services Digital Network) basic and system subscriptions as well as other analogue or digital terminal equipment based on semi-fixed connections.

In a wireless local loop (WLL), a terminal device is connected via a wireless link to an access node (AN) or a WLL controller. The access node may consist of multiplexers, crossbar switches and various transmitting systems. The WLL system may be based e.g. on technology used in mobile telephone systems, such as the GSM/DCS1800 technology (GSM, Global System for Mobile Communications; DCS, Digital Cellular System). GSM is a European digital mobile communication system standardised by ETSI. DCS-1800 is a mobile communication system standardised by ETSI, which is based on the GSM specification and aims at a more effective use of microcells and which works in the frequency range of 1800 MHz. Between the terminal device and the access node there is a base station, through which call signals sent by the terminal device over a radio channel are transmitted via the access node to a public telephone network and vice versa. The access node or WLL controller can be connected to the telephone exchange using e.g. a V5.1 or V5.2 interface.

PSTN signalling (PSTN, Public Switch Telecommunication Network), analogue subscribers, over a V5 interface is nationally defined in each country. For this reason, the signalling at the time of call setdown may vary somewhat, depending on the country where the communication system is being operated.

According to the V5 specification, a local exchange may send a disconnect message to the access node to initiate call setdown. According to the specification, the disconnect message causes disconnection of the call and release of the resources reserved for the call both in the access node and in the local exchange.

Call setdown is normally initiated only after the subscriber has hung up. If the subscriber does not hang up after the call has been finished, then the local exchange may send the access node a signal message indicating that it is expecting the subscriber to hang up and that the voltage supply to the subscriber can be interrupted. After this, if the subscriber continues to keep the receiver lifted, then, upon the lapse of a standard time-out period, the local exchange will send the access node a disconnect message, whereupon the access node acknowledges the disconnect message.

This results in a serious conflict. In the local exchange, all resources have been released, but the subscriber is keeping the receiver lifted. This is an undefined condition. In this situation, a new setup request for a call to the subscriber may be received although the subscriber has not hung up to close the previous call.

SUMMARY OF THE INVENTION

The object of the present invention is to eliminate the drawbacks described above. A specific object of the invention is to disclose a procedure that enables a communication system to recover as quickly as possible from the conflict situation described above.

In the procedure of the invention, an access node receives an unexpected disconnect message from the local exchange, which is connected to the access node via a V5 interface. The disconnect message causes the release of call resources in the local exchange. Further, in the procedure of the invention, signalling consistent with the V5 standard, defined in the above-mentioned standards, is used in the connection between the access node and the telephone exchange, which is a standard V5 interface.

According to the invention, the resources needed for the call in, the access node are preserved in spite of the disconnect message sent by the local exchange. Immediately upon acknowledgement of the disconnect message, the local exchange is informed that the subscriber has the receiver lifted, by sending the local exchange an establish message indicating a new call, whereupon the local exchange reserves the required call resources again and thus the subscriber is regarded as being busy, in the local exchange as well.

If the subscriber's resources are reserved in the access node but released in the local exchange, then this is an undefined situation. In the procedure of the invention, such a situation arises momentarily, but as signalling is still continued, in practice the occurrence of a lasting undefined condition is prevented.

The invention makes it possible to avoid the occurrence of an undefined condition between access node and local exchange in which the local exchange might attempt to transmit a new call to a subscriber who is busy or e.g. has the receiver lifted.

In an embodiment of the procedure, the reserved call resources of the access node are used for the setup of a new call, or at least the subscriber is given a chance to set up a new call using the reserved resources.

In an embodiment of the procedure, the speech oath of the access node to the local exchange is detached when a disconnect message from the local exchange is received at the access node. The speech path is detached to prevent the subscriber from hearing the vague sounds produced when the local exchange is passing the subscriber to a different time slot in the V5 interface.

In an embodiment of the procedure, an acknowledgement of the disconnect message is sent from the access node to the local exchange and the subscriber's call resources are left reserved in the access node. Further, a new call setup message is sent from the access node to the local exchange immediately after the acknowledgement. Thus, the local exchange receives almost simultaneously an acknowledgement of call setdown and a message indicating that the subscriber is busy. In addition, since the local exchange continues its normal operation after receiving the acknowledgement of the disconnect message, the subscriber is given a dial tone on the basis of the call setup request. The subscriber will notice the disconnection of the previous call because the busy tone sent by the local exchange is changed into a dial tone.

BRIEF DESCRIPTION OF THE DRAWINGS

In the following, the invention is described in detail by the aid of an embodiment example by referring to the attached drawing, which presents a flow diagram of the signalling in an embodiment of the present invention.

DETAILED DESCRIPTION OF THE INVENTION

The FIGURE illustrates the signalling between the access node AN and the local exchange LE after the normal speech phase. After the speech phase, the local exchange LE sends a signal message to the access node AN because the subscriber still has the receiver lifted. The signal message tells the access node AN that the voltage supply to the subscriber can be disconnected. After the busy tone phase and after the standard time-out, the local exchange LE sends a disconnect message to the access node AN. The disconnect message releases the call resources at the local exchange LE but it does not release the resources in the access node AN although the access node AN sends the local exchange LE an acknowledgement of the disconnect message, i.e. a disconnect_complete message. Immediately upon sending the acknowledgement of the disconnect message, the access node AN sends the local exchange LE a new call setup request, or an establish message. The access node AN detaches the subscriber's speech path from the local exchange LE when the access node AN receives the disconnect message, and the speech path is opened when the local exchange LE responds by sending an acknowledgement of the call setup request, i.e. an establish_ack message to the access node AN. The essential point about these actions is that, if the receiver remains lifted, the access node AN is all the time trying to tell the local exchange LE that the subscriber is busy. This prevents the local exchange LE from passing an incoming call to the subscriber while the latter still has the receiver lifted and is busy.

The local exchange LE can also send a disconnect_complete message directly in the middle of a call without expecting an acknowledgement. The local exchange LE sends a disconnect_complete message and releases the call resources without acknowledgement from the access node AN. In this case, the access node AN could proceed in the same way as above, in other words, after receiving the disconnect_complete message the access node AN detaches the speech path and sends a new establish message, from which the local exchange LE learns that the subscriber is busy and that the subscriber wishes to set up a new call.

The invention has been described in the foregoing by way of example with reference to one of its preferred embodiments. This is naturally not meant to limit the invention, but instead many alternatives and variations are possible within the sphere of protection defined by the set of claims.

What is claimed is:

1. A method for the processing of an unexpected disconnect request comprising:

coupling an access node to a local exchange over a V5 interface;

performing a call setdown by a disconnect message, which is sent from the local exchange and on the basis of which call resources in the local exchange are released;

preserving the call resources reserved in the access node for a call; and informing a local exchange that a subscriber is busy, thus preventing an occurrence of an undefined condition between the local exchange and the access node.

2. The method as defined in claim 1, wherein the reserved call resources of the access node are used for the setup of a new call.

3. The method as defined in claim 1, wherein a speech path to the local exchange is detached in the access node when the disconnect message from the local exchange is received at the access node.

4. The method as defined in claim 1, wherein an acknowledgement of the disconnect message is sent from the access node to the local exchange and the subscriber's call resources are kept reserved in the access node.

5. The method as defined in claim 1, wherein a new call setup request message is sent from the access node to the local exchange immediately after the acknowledgement of the disconnect message.

* * * * *